United States Patent [19]

Garner et al.

[11] 4,039,557
[45] Aug. 2, 1977

[54] CHROMENOPYRAZOLE COMPOUNDS

[75] Inventors: Robert Garner, Bury, England; Jean Claude Petitpierre, Kaiseraugst, Switzerland

[73] Assignee: Ciba-Geigy AG, Basel, Switzerland

[21] Appl. No.: 651,380

[22] Filed: Jan. 22, 1976

Related U.S. Application Data

[62] Division of Ser. No. 500,200, Aug. 23, 1974, abandoned.

[30] Foreign Application Priority Data

Sept. 6, 1973 United Kingdom ............... 41964/73

[51] Int. Cl.² .......................................... C07D 231/00
[52] U.S. Cl. ..................................... 548/370; 548/359
[58] Field of Search ..................................... 260/310 R

[56] References Cited

U.S. PATENT DOCUMENTS 3,697,540  10/1972  Kemeira et al. ................. 260/310 R

FOREIGN PATENT DOCUMENTS 1,264,636  7/1969  United Kingdom

*Primary Examiner*—Stanley J. Friedman
*Attorney, Agent, or Firm*—Karl F. Jorda; Edward McC. Roberts; Prabodh I. Almaula

[57] ABSTRACT

Thermoreactive recording material comprising at least a support, a binder, a color former and an electron accepting substance, wherein the color former is a compound of the formula

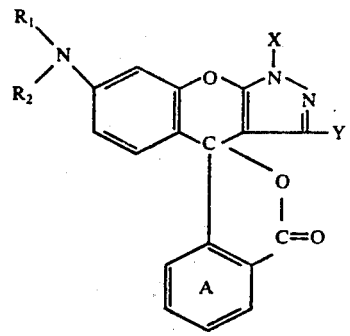

wherein
$R_1$ and $R_2$, independently of the other, represent hydrogen, alkyl with 1 to 12 carbon atoms, alkoxyalkyl with 2 to 8 carbon atoms, cycloalkyl with 5 or 6 carbon atoms, benzyl or phenyl, X and Y, independently of the other, represent alkyl with 1 to 12 carbon atoms, alkoxy with 1 to 12 carbon atoms, phenyl or phenyl substituted by methyl, nitro, halogen, amino or an amino group mono- or disubstituted by alkyl with 1 to 12 carbon atoms, acyl with 2 to 12 carbon atoms or by benzyl, and the benzene ring A may be substituted by 1 to 4 halogen atoms.

6 Claims, No Drawings

CHROMENOPYRAZOLE COMPOUNDS

This is a division of application Ser. No. 500,200, filed on Aug. 23, 1974, now abandoned.

The present invention relates to thermoreactive recording material comprising at least a support, a binder, a colour former and an electron accepting substance, wherein the colour former is a chromeno pyrazole compound of the formula

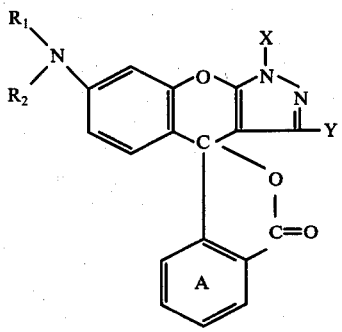

(1)

wherein
- $R_1$ and $R_2$, independently of the other, represent hydrogen, alkyl with 1 to 12 carbon atoms, alkoxyalkyl with 2 to 8 carbon atoms, cycloalkyl with 5 or 6 carbon atoms, benzyl or phenyl,
- X and Y, independently of the other, represent alkyl with 1 to 12 carbon atoms, alkoxy with 1 to 12 carbon atoms, phenyl or phenyl substituted by methyl, nitro, halogen, amino or an amino group mono- or disubstituted by alkyl with 1 to 12 carbon atoms, acyl with 2 to 12 carbon atoms or benzyl and the benzene ring A may be substituted by 1 to 4 halogen atoms.

When the radicals $R_1$ and $R_2$ represent alkyl, they may be straight or branched chain alkyl groups. Examples of said alkyl groups are methyl, ethyl, n-propyl, iso-propyl, n-butyl or sec.-butyl, octyl or dodecyl. Alkoxyalkyl in $R_1$ and $R_2$ may have 1 to 4 carbon atoms in each alkyl part and stands preferably for β-methoxy-ethyl or β-ethoxyethyl. Cycloalkyl in the meanings of these R-radicals may be cyclopentyl or preferably cyclohexyl.

As a 1 or alkoxy, X and Y and preferably methyl, methoxy or ethoxy.

Alkyl in the N-substituted aminophenyl group X or Y may be methyl, ethyl, n-butyl, octyl or dodecyl. Among the acyl groups the alkanoyl groups containing 2 to 4 carbon atoms such as acetyl or propionyl, are especially noteworthy. A halogen substituent may be fluorine, bromine or especially chlorine.

Particularly valuable chromeno pyrazole compounds of the formula (1) are those of formula (2)

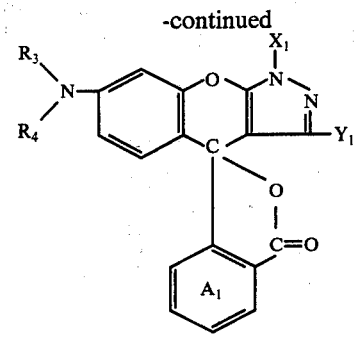

wherein
- $R_3$ and $R_4$, independently of the other, represent alkyl with 1 to 4 carbon atoms or benzyl,
- $X_1$ represents alkyl with 1 to 4 carbon atoms, phenyl or phenyl substituted by methyl, chlorine, nitro or an amino group mono- or disubstituted by alkyl with 1 to 4 carbon atoms, alkanoyl with 2 to 4 carbon atoms or by benzyl,
- $Y_1$ represents alkyl with 1 to 3 carbon atoms, preferably methyl, and
- the benzene ring $A_1$ is unsubstituted or further substituted by 1 to 4 halogen atoms, especially chlorine atoms, preferably the ring $A_1$ is not further substituted. The nitro and amino substituents of the substituted phenyl radical in $X_1$ are preferably in p-position to the nitrogen atom of the pyrazole ring.

Of a special interest is a thermoreactive recording material wherein the colour former is a chromeno pyrazole compound of the formula (3)

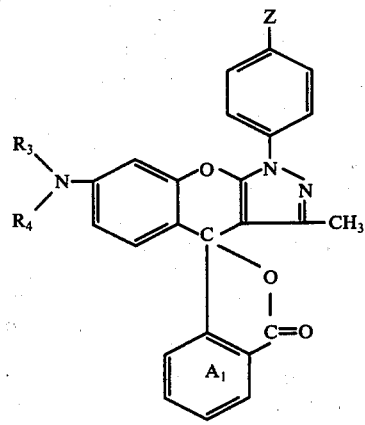

wherein
- $A_1$, $R_3$ and $R_4$ have the given meanings and
- Z represents nitro or amino mono- or disubstituted by alkyl with 1 to 4 carbon atoms, alkanoyl with 2 to 4 carbon atoms or benzyl.

Among the compounds of formula (3), Z is preferably an amino group mono- or disubstituted by alkyl with 1 to 4 carbon atoms or benzyl. In this case Z is most preferably diethylamino or dibenzylamino.

The chromeno pyrazole compounds used as colour former in the present thermoreactive recording material are partial well-known and partial novel compounds which may be produced by conventional methods known in the art.

Compounds of formula (1), wherein X and Y represent alkyl, alkoxy, phenyl or phenyl substituted by methyl, nitro, halogen or unsubstituted amino are, for example, prepared by condensing, advantageously in the presence of a condensing agent, a benzophenone compound of the formula

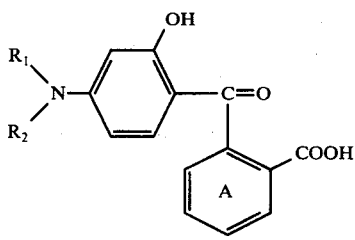

wherein A, $R_1$ and $R_2$ have the given meanings with a pyrazolone compound of the formula

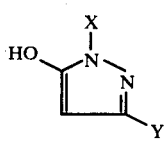

wherein X and Y have the given meanings.

The reaction is preferably carried out by allowing the reactants to reach together in the presence of an acidic condensing agent. Examples of suitable condensing agents are acetic anhydride, phosphoric acid, phosphorus oxychloride, anhydrous zinc chloride or preferably sulphuric acid of above 60% concentration. As a rule substantially equimolar amounts of the reactants are condensed, advantageously at 50° to 130° C. After condensation the reaction mixture is poured into a large amount of ice water and the precipitated product is filtered off and treated with aqueous alkali to obtain compounds of formula (1) as colourless crystals.

Compounds of formula (1), wherein X and Y or both are an N-substituted aminophenyl radical, may be manufactured by reacting a compound of the formula (1), wherein at least one of X and Y represents amino-phenyl with a reactive ester of an alkyl or benzyl alcohol with an inorganic or organic acid, such as the methyl, ethyl, n-propyl, n-butyl or benzyl ester of hydrochloric acid, hydrobromic acid or hydroiodic acid, the dimethyl or diethyl sulphate, or with a reactive functional derivative of carboxylic acids, particularly fatty acid halides and anhydrides, such as acetyl chloride, acetyl bromide or acetic anhydride.

Colour formers of formula (1) which may be used in the present thermoreactive recording material are more or less colourless compounds. When brought into contact with an acidic active substance, i.e. an electron accepting substance, such as an acidic clay, e.g. attapulgus clay or silton clay, silica or a phenolic resin or compound or an organic acid, these colour formers yield a large variety of mostly strong yellow-orange, orange, orange-red or brown-orange colours. They are thus valuable in admixture with other known colour formers in order to achieve grey or black shades.

Thermoreactive recording systems comprise heat-sensitive recording and copying materials and papers. These systems are used e.g. for the recording of information, for example in electronic computers, in teleprinters or telewriters, in measuring instruments. The mark-forming can also be made manually with a heated pen. A further means for inducing heat-initiated marks are laser beams. The thermoreactive recording material may be arranged in such a manner that the colour former is dissolved or dispersed in a layer of the binder, and in a second layer the developer and the electron-accepting substance are dissolved or dispersed in the binder. Another possibility consists in dispersing both the colour former and the developer in one layer. By means of heat the binder is softened at specific areas imagewise and the dyestuff is formed at these points, since only at the points where heat is applied does the colour former come into contact with the electron-accepting substance.

The developers are the same electron-accepting substances as are used in pressure sensitive papers. For practical reasons the developer should be solid at room temperature and melt or soften above 50° C. Examples of such products are the already mentioned phenolic resins, phenolic compounds such as 4-tert.-butylphenol, 4-phenylphenol, 4-hydroxydiphenyloxide, α-naphthol, 4-hydroxybenzoic acid methyl ester, β-naphthol, 4--hydroxyacetophenone, 2,2'-dihydroxydiphenyl, 4,4'-isopropylidene-diphenol, 4,4'-isopropyliden-bis-(2-methylphenol), 4,4'-bis-(hydroxyphenyl) valeric acid, hydroquinone, pyrogallol, phloroglucinol, p-, m-, o-hydroxybenzoic acid, gallic acid, 1-hydroxy-2-naphthoic acid; boric acid, and the aliphatic dicarboxylic acids e.g. tartaric acid, oxalic acid, maleic acid, citraconic acid or succinic acid.

Preferably fusible, film-forming binders are used. These binders should be water-soluble, since the chromenopyrazole and the developer are water-insoluble. The binder should be able to disperse and fix the colour former and the developer at room temperature. In this way the two reactive components are present in the material in as non-associated form. After applying heat, the binder softens or melts, which enables the colour former to come into contact with the developer and to form a dyestuff. In these cases the developers may be any of the fore-mentioned co-reactants such as clays, phenolic resins or other phenolic compounds.

Water-soluble or at least in water swellable binders are e.g. hydrophilic polymers such as polyvinyl, alcohol, polyacrylic acid, hydroxyethylcellulose, methylcellulose, carboxymethylcellulose, polyacrylamide, polyvinylpyrrolidone, gelatine or starch.

In so far as the colour former and the developer are coated in two separate layers, binders which are water insoluble may be used, i.e. binders soluble in non-polar or only weakly polar solvents, e.g. natural rubber, synthetic rubber, chlorinated rubber, alkyd resins, polystyrene, styrene-butadiene-copolymers, polymethylmethacrylates, ethylcellulose, nitrocellulose or polyvinylcarbazole.

The preferred arrangement, however, is colour former and developer in a water-soluble binder in one layer.

The coatings of the thermoreactive material may contain further additives. To improve the degree of whiteness, to ease the printing of the papers and to prevent the sticking of the heated pen, these materials may contain e.g. talc, $TiO_2$, ZnO, or $CaCO_3$. In order to produce the dyestuff only within a limited temperature range there may be added substances such as urea, thiourea, acetanilide, phthalic acid anhydride or other corresponding meltable products which induce the simultaneous melting of colour former and developer.

Typical thermoreactive recording materials wherein the present colour formers may be used e.g. are described in German Patent application 2,228,581, French patent 1,524,826, Swiss patent 407,185, German Patent application 2,110,854, Swiss patents 164,976, 444,196 and 444,197.

In the following Examples percentages are by weight.

SYNTHESIS EXAMPLES

A. Chromeno pyrazole compound of formula (3), wherein $R_3$ and $R_4$ are ethyl, Z is diethylamino and A is not further substituted.
  a. A mixture of 31.3 g of 2'-carboxy-4-diethylamino-2-hydroxy-benzophenone, the sulphate salt of 18.9 g 1-(p-aminophenyl)-3-methylpyrazol-5-one and 180 g 98% sulphuric acid is stirred for 1½ hours at 90° C and for a further 1½ hours at 120° C, then cooled to 25° C and quenched into 500 g ice. After adjustment of the pH to 4, the amino compound of formula (3), wherein $R_3$ and $R_4$ are ethyl and Z is $NH_2$, is filtered off, washed with water and dried. Yield: 43 g.
  b. A mixture of 11.6 g of the amino compound obtained according to (a), 4.6 ml ethyl bromide, 5 g sodium bicarbonate and 40 ml dimethyl-sulphoxide is heated at 80° C for 4 hours. After cooling, diluting with water, filtering and drying 11.6 g of a chromeno pyrazole compound of formula (3), wherein $R_3$ and $R_4$ are ethyl, Z is diethylamino and the benzene ring A is not further substituted, are obtained. The diethylamino compound after crystallisation from aqueous methanol has a melting point of 113° C.

B. Chromeno pyrazole compound of formula (3), wherein $R_3$ and $R_4$ are ethyl, Z is dibenzylamino and A is not further substituted.

A solution of 11.65 g of the amino compound obtained according to A(a) in 50 ml benzyl chloride is heated for 3 hours at 100° C. Excess benzyl chloride is then removed by steam distillation. The aqueous residue is neutralized to pH 7 with sodium bicarbonate and after decanting the aqueous liquor the residual product is crystallized from methanol. 7.2 g of the title compound are obtained. Melting point 220°–221° C.

EXAMPLE 1

6 g of an aqueous dispersion containing 1,57% of a chromeno pyrazole compound of the formula

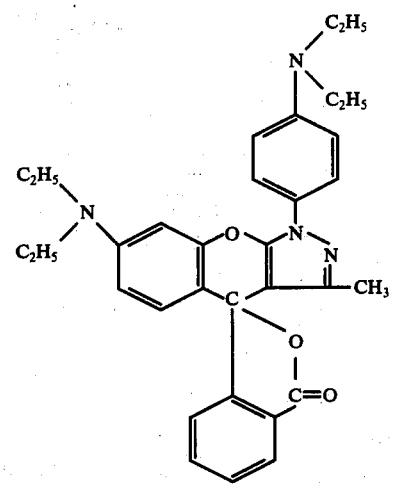

and 6,7% of polyvinyl alcohol are mixed with 134 g of an aqueous dispersion containing 14% 4,4-isopropylidene-diphenol and 6% polyvinyl alcohol. This mixture is coated on paper and dried. When contacted with a heated stylus, an intense brown-orange colour is obtained which has excellent fastness to light.

Similar effects can be obtained by using any other colour former of the following Table:

Table

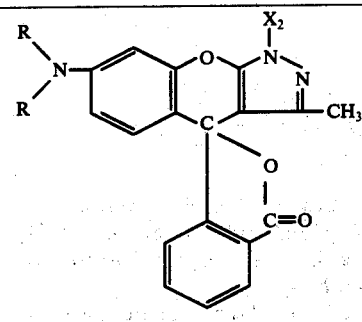

| Ex | R | $X_2$ | m.p.° C | Colour |
|---|---|---|---|---|
| 2 | $CH_3$ | —⟨phenyl⟩ | 296–298 | orange |
| 3 | $C_2H_5$ | —⟨phenyl⟩—$NO_2$ | 252–263 | orange |
| 4 | $C_2H_5$ | —⟨phenyl⟩—$NH$—$COCH_3$ | 266–268 | orange |
| 5 | $C_2H_5$ | —⟨phenyl⟩—$N(COCH_3)_2$ | 261–262 | orange |
| 6 | $C_2H_5$ | —⟨phenyl⟩—$N(CH_2$—⟨phenyl⟩$)_2$ | 220–221 | brown-orange |
| 7 | $C_2H_5$ | Cl,Cl,Cl-substituted phenyl | 213–214 | yellow-orange |

Table-continued

| Ex | R | X₂ | m.p.° C | Colour |
|---|---|---|---|---|
| 8 | C₂H₅ | —⟨⟩—CH₃ | 186–187 | yellow-orange |
| 9 | C₂H₅; CH₂—⟨⟩ | —⟨⟩ | 198–200 | orange |
| 10 | C₂H₅ | —CH₃ | 177–180 | yellow-orange |

We claim:
1. A chromenopyrazole compound of the formula

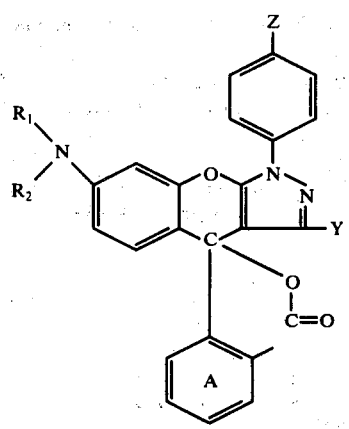

wherein
R₁ and R₂, independently of the other, represent hydrogen, alkyl of 1 to 12 carbon atoms, alkoxyalkyl of 2 to 8 carbon atoms, cycloalkyl of 5 to 6 carbon atoms, benzyl or phenyl,
Y represents alkyl of 1 to 12 carbon atoms, alkoxy of 1 to 12 carbon atoms, phenyl or phenyl substituted by methyl, nitro, halogen, amino or an amino group mono- or disubstituted by alkyl of 1 to 12 carbon atoms, acyl of 2 to 12 carbon atoms or by benzyl, and
Z represents amino mono- or disubstituted by alkyl with 1 to 4 carbon atoms, or benzyl, and
the benzen ring A is unsubstituted or substituted by 1 to 4 carbon atoms.

2. A chromenopyrazole compound according to claim 1, of the formula

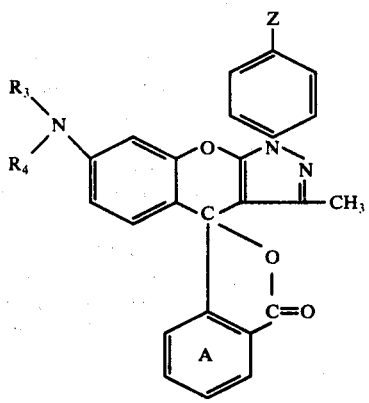

wherein
R₃ and R₄, independently of the other, represents alkyl of 1 to 4 carbon atoms or benzyl,
Z represents amino mono- or disubstituted by alkyl with 1 to 4 carbon atoms, or benzyl, and the benzene ring A is unsubstituted or substituted by 1 to 4 hologen atoms.

3. A chromenopyrazole compound according to claim 2, wherein Z is an amino group mono- or disubstituted by alkyl of 1 to 4 carbon atoms or benzyl.

4. A chromenopyrazole compound according to claim 3, wherein Z is diethylamino or dibenzylamino.

5. A chromenopyrazole compound according to claim 4, wherein R₃ and R₄ both are ethyl, Z is diethylamino and the benzene ring A is unsubstituted.

6. A chromenopyrazole compound according to claim 4, wherein R₃ and R₄ both are ethyl, Z is dibenzylamino and the benzene ring A is unsubstituted.

* * * * *